United States Patent
Kurosawa

(10) Patent No.: US 7,798,731 B2
(45) Date of Patent: Sep. 21, 2010

(54) DIAPHRAGM DRIVING DEVICE OF A DIGITAL CAMERA SYSTEM USING AN INTERCHANGEABLE LENS

(75) Inventor: Yuichi Kurosawa, Tokyo (JP)

(73) Assignee: Hoya Corporation, Tokyo (JP)

( * ) Notice: Subject to any disclaimer, the term of this patent is extended or adjusted under 35 U.S.C. 154(b) by 263 days.

(21) Appl. No.: 12/028,972

(22) Filed: Feb. 11, 2008

(65) Prior Publication Data

US 2008/0199176 A1 Aug. 21, 2008

(30) Foreign Application Priority Data

Feb. 15, 2007 (JP) .............................. 2007-035067

(51) Int. Cl.
*G03B 9/02* (2006.01)
(52) U.S. Cl. ...................................................... 396/505
(58) Field of Classification Search ......... 396/449–451, 396/505–510
See application file for complete search history.

(56) References Cited

U.S. PATENT DOCUMENTS

| | | | | |
|---|---|---|---|---|
| 3,687,047 A | * | 8/1972 | Ito .............................. | 396/509 |
| 3,765,315 A | * | 10/1973 | Hokari ........................ | 396/509 |
| 4,319,824 A | * | 3/1982 | Rossmann ................... | 396/509 |
| 4,443,083 A | * | 4/1984 | Nakano ....................... | 396/354 |
| 4,451,131 A | * | 5/1984 | Shimizu ...................... | 396/505 |
| 5,410,432 A | * | 4/1995 | Kobayashi .................. | 359/740 |
| 6,640,056 B2 | * | 10/2003 | Konishi et al. .............. | 396/259 |
| 7,085,032 B2 | * | 8/2006 | Sato ............................ | 359/230 |
| 2007/0019942 A1 | | 1/2007 | Kurosawa | |
| 2007/0195170 A1 | | 8/2007 | Yamamoto et al. | |
| 2007/0196083 A1 | | 8/2007 | Yamamoto et al. | |
| 2007/0196091 A1 | | 8/2007 | Yamaguchi | |
| 2007/0196101 A1 | | 8/2007 | Maeda | |

FOREIGN PATENT DOCUMENTS

JP     2002-290828     10/1928

OTHER PUBLICATIONS

English language Abstract of JP 2002-290828.

* cited by examiner

*Primary Examiner*—W. B. Perkey
*Assistant Examiner*—Dennis Hancock
(74) *Attorney, Agent, or Firm*—Greenblum & Bernstein P.L.C.

(57) ABSTRACT

A diaphragm driving device is provided in a camera body of a digital camera to which an interchangeable lens is detachably attached, the interchangeable lens including a diaphragm mechanism having a diaphragm control bar for changing an aperture size by a rotation of the diaphragm control bar about an optical axis. The camera body includes a diaphragm-driving slide plate which engages with the diaphragm control bar when the interchangeable lens is attached to the camera body; a diaphragm drive motor which rotates in both forward and reverse directions for moving the diaphragm-driving slide plate step wise in accordance with object brightness information of an object image formed through the interchangeable lens; and a converting mechanism for converting the rotation of the diaphragm drive motor in the both directions into a force for moving the diaphragm-driving slide plate.

14 Claims, 8 Drawing Sheets

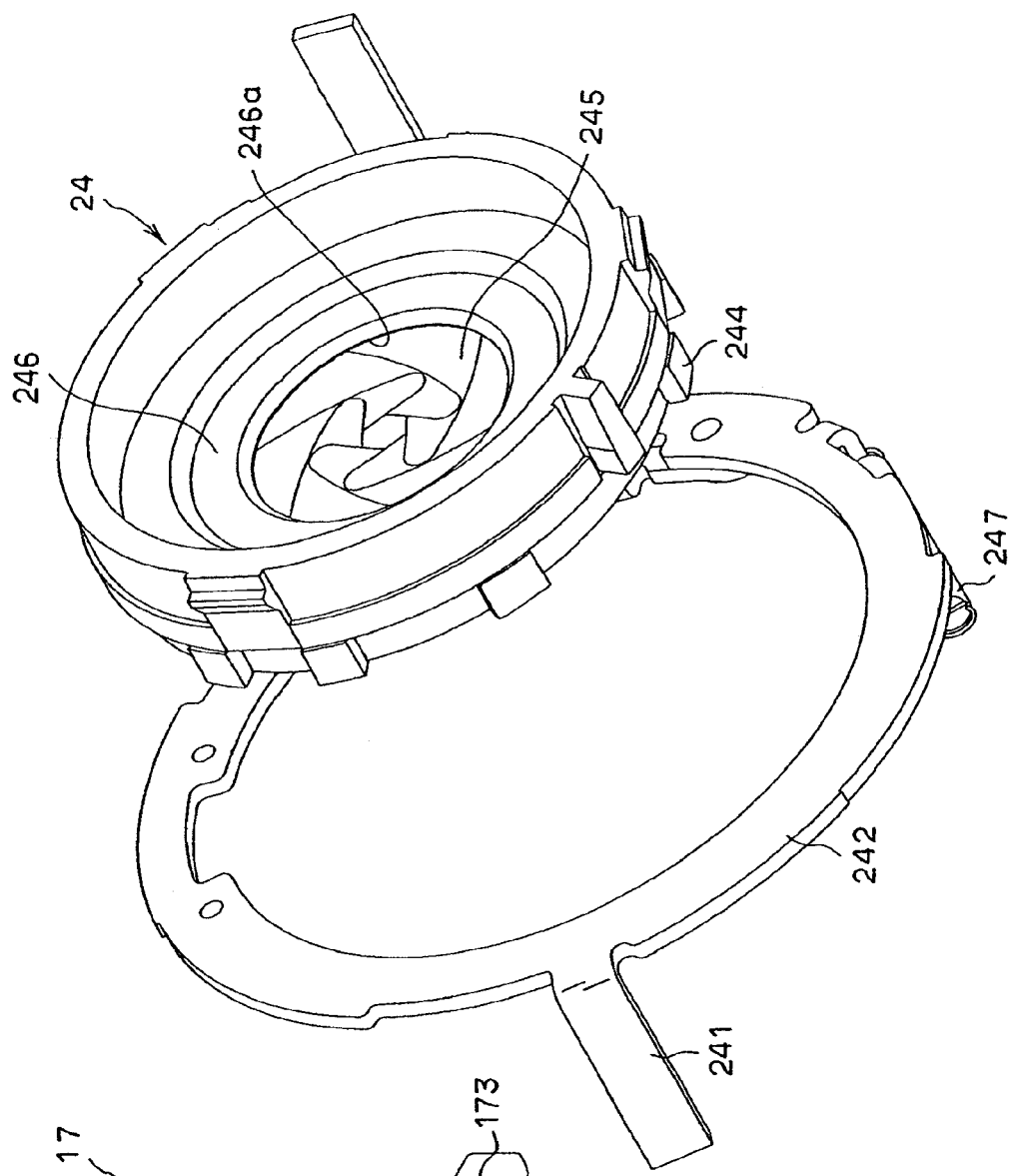
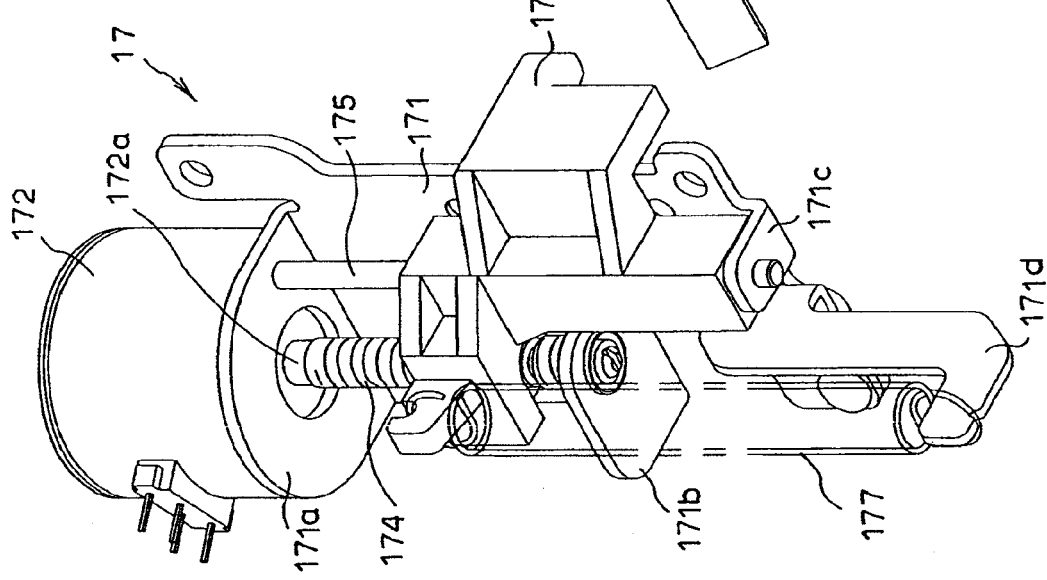

DIAPHRAGM DRIVING DEVICE OF A DIGITAL CAMERA SYSTEM USING AN INTERCHANGEABLE LENS

BACKGROUND OF THE INVENTION

1. Field of the Invention

The present invention relates to a digital camera system (e.g., SLR digital camera system) including a camera body and an interchangeable lens that is detachably attached to the camera body, and in particular the present invention relates to a diaphragm driving device of the digital camera system which is capable of recording moving images while controlling the operation of an adjustable diaphragm of the interchangeable lens.

2. Description of the Prior Art

In conventional camera systems using an interchangeable photographic lens (hereinafter referred to as an interchangeable lens), especially in SLR digital camera systems, the aperture size of a diaphragm of the interchangeable lens is controlled by a diaphragm-driving slide plate provided in a camera body. Namely, the interchangeable lens includes a diaphragm control bar for changing the F-number via rotation thereof about an optical axis, and the camera body includes the diaphragm slide plate which engages with the diaphragm control bar when the interchangeable lens is attached to the camera body. When taking a still image (i.e., a still photograph), before a shutter of the camera is released, the diaphragm-driving slide plate is moved in advance to a position in accordance with the brightness of an object image so that the diaphragm control bar rotates about the optical axis via engagement of the diaphragm-driving slide plate therewith.

Conventionally, when taking a still image (still photograph) upon a shutter release, the diaphragm-driving slide plate is moved by an amount of movement (distance) that is determined in accordance with the brightness of an object image by a linear moving device having a latch mechanism. Accordingly, the conventional diaphragm driving device of the SLR digital camera cannot be applied to the capturing of moving images (movies), because upon taking the moving images the brightness of an object image is continuously changed, while the diaphragm value of the interchangeable lens cannot be changed by the conventional linear moving device having the latch mechanism.

SUMMARY OF THE INVENTION

The present invention provides a diaphragm driving device, for use in a digital camera system using an interchangeable lens, which enables even a conventional interchangeable lens having a diaphragm control bar to be utilized for recording moving images at a correct exposure even when the brightness of an object image changes during movie recording.

According to an aspect of the present invention, a diaphragm driving device is provided in a camera body of a digital camera to which an interchangeable lens is detachably attached, the interchangeable lens including a diaphragm mechanism having a diaphragm control bar for changing an aperture size (F-number) by a rotation of the diaphragm control bar about an optical axis. The camera body includes a diaphragm-driving slide plate which engages with the diaphragm control bar when the interchangeable lens is attached to the camera body; a diaphragm drive motor which rotates in both forward and reverse directions for moving the diaphragm-driving slide plate step wise in accordance with object brightness information of an object image formed through the interchangeable lens; and a converting mechanism for converting the rotation of the diaphragm drive motor in the forward and reverse directions into a force for moving the diaphragm-driving slide plate in corresponding diaphragm stop-down and diaphragm opening directions.

It is desirable for the diaphragm drive motor to be rotated when the diaphragm-driving slide plate is forcibly moved.

It is desirable for the converting mechanism to include a lead screw which is rotated on an axis thereof by the diaphragm drive motor, and a lead nut which is screw-engaged with the lead screw to be movable thereon along the axis of the lead screw. The diaphragm-driving slide plate is integral with the lead nut.

According to the present invention, if an already-existing interchangeable lens that carries out diaphragm control using a diaphragm control bar is mounted to a camera body having the diaphragm driving device according to the present invention, the diaphragm drive motor can control the rotational position of the diaphragm control bar to control the F-number of the interchangeable lens in response to changes in object brightness during the time moving images are recorded with the main mirror being retracted to a retracted position thereof, which makes it possible to record moving images at correct exposure.

It is desirable for a lead angle of the lead screw to be predetermined to be an angle which makes it possible to rotate the lead screw to move the diaphragm-driving slide plate against a detent torque of the diaphragm drive motor. It is desirable for the converting mechanism to include a first spring for bringing the diaphragm-driving slide plate to move to a predetermined position thereof. It is desirable for the diaphragm mechanism to be in a maximum aperture-size state when the diaphragm-driving slide plate is in the predetermined position.

According to this configuration, even when different types of interchangeable lenses whose initial positions of the diaphragm control bars are different from each other are selectively attached to the camera body, it becomes possible to bring the diaphragm mechanism into a maximum aperture-size state by moving the diaphragm-driving slide plate to the initial position thereof when the diaphragm drive motor is stopped rotating. In this case, it is desirable that the diaphragm drive motor be a stepping motor, and the camera body can exercise diaphragm control by setting the rotational position of the diaphragm drive motor at this time as the initial position thereof.

It is desirable for the diaphragm drive motor to be a stepping motor. It is desirable for the diaphragm mechanism to include a second spring for causing the diaphragm control bar to rotate to an initial position thereof, and for a spring force of the first spring to be greater than a spring force of the second spring so that the first spring is capable of moving diaphragm-driving slide plate against a detent torque of the diaphragm drive motor.

According to this configuration, the diaphragm mechanism of the interchangeable lens can be brought into a maximum aperture-size state by the spring force of the first spring when the interchangeable lens is attached to the camera body; moreover, the diaphragm mechanism of the interchangeable lens can be controlled to adjust the F-number between minimum and maximum F-numbers by the operation of the diaphragm drive motor during movie recording.

It is desirable for the diaphragm mechanism to be in a minimum aperture-size state when the diaphragm control bar is in an initial position thereof, and for the diaphragm mechanism to be brought into a maximum aperture-size state by the diaphragm-driving slide plate at the predetermined position thereof when the interchangeable lens is attached to the camera body.

It is desirable for the diaphragm driving device to further include a diaphragm ring positioned coaxially around the optical axis to be rotatable about the optical axis, the diaphragm control bar being integrally formed with the diaphragm ring.

It is desirable for the diaphragm drive motor to be supported by a frame fixed to a mirror box, in which a quick-return mirror is positioned, of the camera body.

It is desirable for a rotary output shaft of the diaphragm drive motor to extend in a vertical direction of the camera body, the lead screw being coaxially fixed to the rotary output shaft to extend downward therefrom.

It is desirable for the digital camera to include a movie mode and a still-photography mode. Upon the movie mode being selected, the diaphragm drive motor is continuously controlled in accordance with object brightness information of an object image formed through the interchangeable lens while a mirror-up operation, in which the quick-return mirror is continuously held in a mirror-up state, is performed.

In an embodiment, a camera body of a digital camera system is provided, to which an interchangeable lens is detachably attached, an adjustable diaphragm of the interchangeable lens being driven between a maximum aperture-size state and a minimum aperture-size state by a rotational movement of a diaphragm control bar of the interchangeable lens about an optical axis. The camera body includes a diaphragm-driving slide plate which engages with the diaphragm control bar when the interchangeable lens is attached to the camera body; a diaphragm drive motor for moving the diaphragm-driving slide plate; and a feed-screw mechanism installed between the diaphragm-driving slide plate and the diaphragm drive motor so that a rotation of the diaphragm drive motor causes the diaphragm-driving slide plate to move linearly via the feed-screw mechanism.

The present disclosure relates to subject matter contained in Japanese Patent Application No. 2007-35067 (filed on Feb. 15, 2007) which is expressly incorporated herein in its entirety.

BRIEF DESCRIPTION OF THE DRAWINGS

The present invention will be discussed below in detail with reference to the accompanying drawings, in which:

FIG. 3A is a perspective view of the diaphragm drive mechanism of the camera body shown in FIG. 1A;

FIG. 3B is an exploded perspective view of a diaphragm mechanism provided in the interchangeable lens shown in FIG. 1B;

DESCRIPTION OF THE PREFERRED EMBODIMENT

Figure 1A:
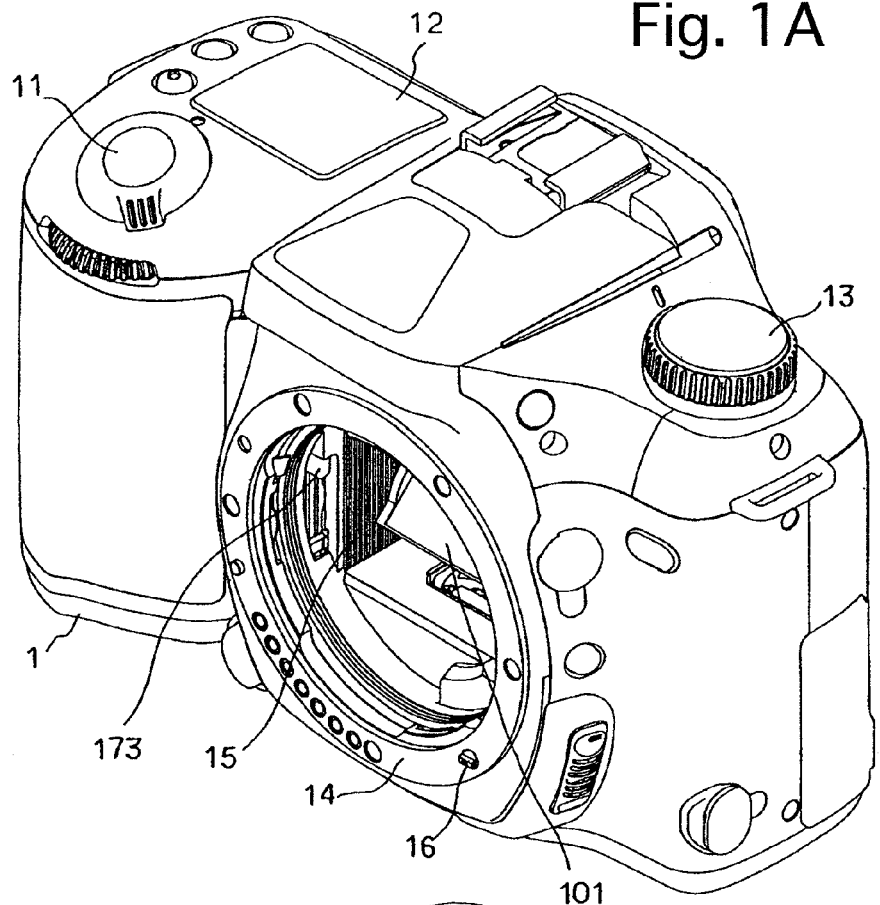
FIG. 1A is a front perspective view of a camera body of an embodiment of a camera system according to the present invention.
Figure 1B:
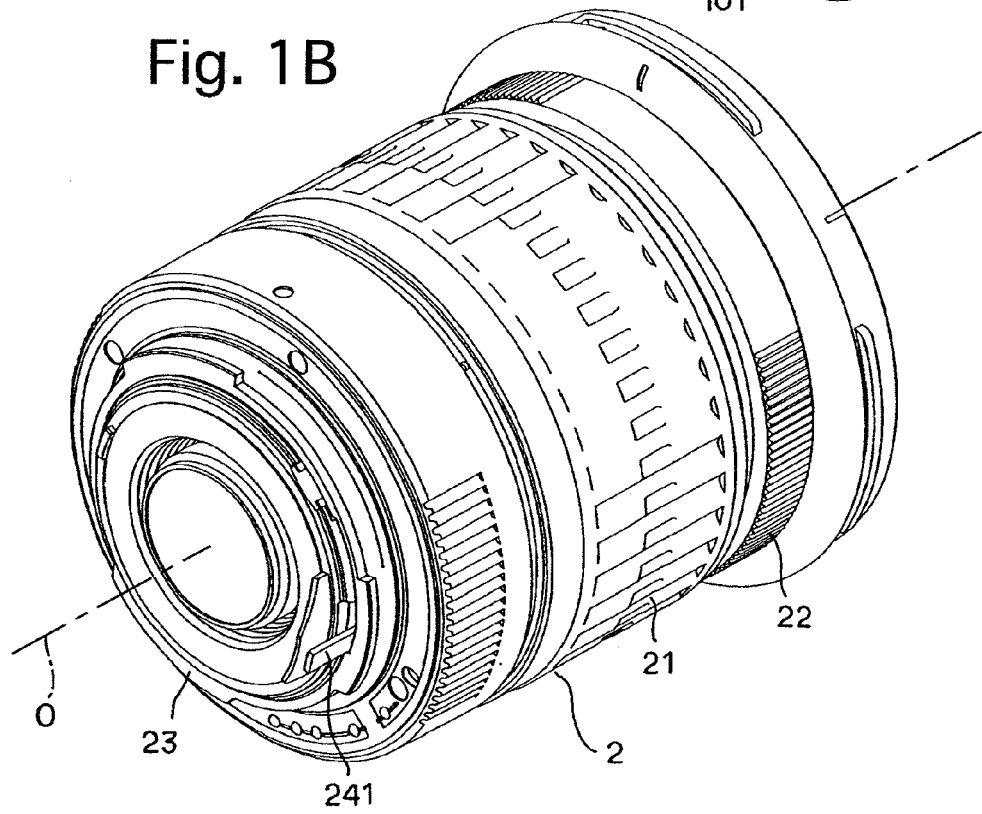
FIG. 1B is a rear perspective view of an interchangeable lens of the camera system.

FIG. 1A is a front perspective view of a camera body (digital camera) 1 of an embodiment of a camera system according to the present invention, and FIG. 1B is a rear perspective view of an interchangeable lens 2 of the camera system which includes a diaphragm control bar 241. As shown in FIG. 1A, the camera body 1 is provided with a release button 11, an LCD indicator 12 and a mode select dial 13. The camera body 1 is provided on the front thereof with a lens mount 14 to which the interchangeable lens 2 is detachably attached. The camera body 1 is provided therein with a mirror box 15 which is exposed at the lens mount 14, and is provided in the mirror box 15 with a main mirror (quick-return mirror) 101 and a diaphragm-driving slide plate 173 which is slidingly moved upwards as viewed in FIG. 1A upon a rise of the main mirror 101. The camera body 1 is provided on a part of the lens mount 14 with an AF coupler 16 for performing AF control of the interchangeable lens 2. The interchangeable lens 2 is provided along the outer periphery thereof with a zoom ring 21 and a focus ring 22, each of which can be manually operated and which are coaxially arranged side by side in the axial direction of the interchangeable lens 2. The interchangeable lens 2 is provided at the rear end thereof with a bayonet mount portion 23 which is brought into engagement with the lens mount 14 of the camera body 1 to attach the interchangeable lens 2 to the camera body 1. The interchangeable lens 2 is provided, in association with the bayonet mount portion 23, with a diaphragm control bar 241 the rear end of which projects rearward from the bayonet mount portion 23 as shown in FIG. 1B. The diaphragm control bar 241 is driven by the diaphragm-driving slide plate 173 of the camera body 1 to drive a diaphragm mechanism 24 provided in the interchangeable lens 2. The diaphragm control bar 241 engages with the diaphragm-driving slide plate 173 when the interchangeable lens 2 is mounted to the camera body 1.

Figure 2A:
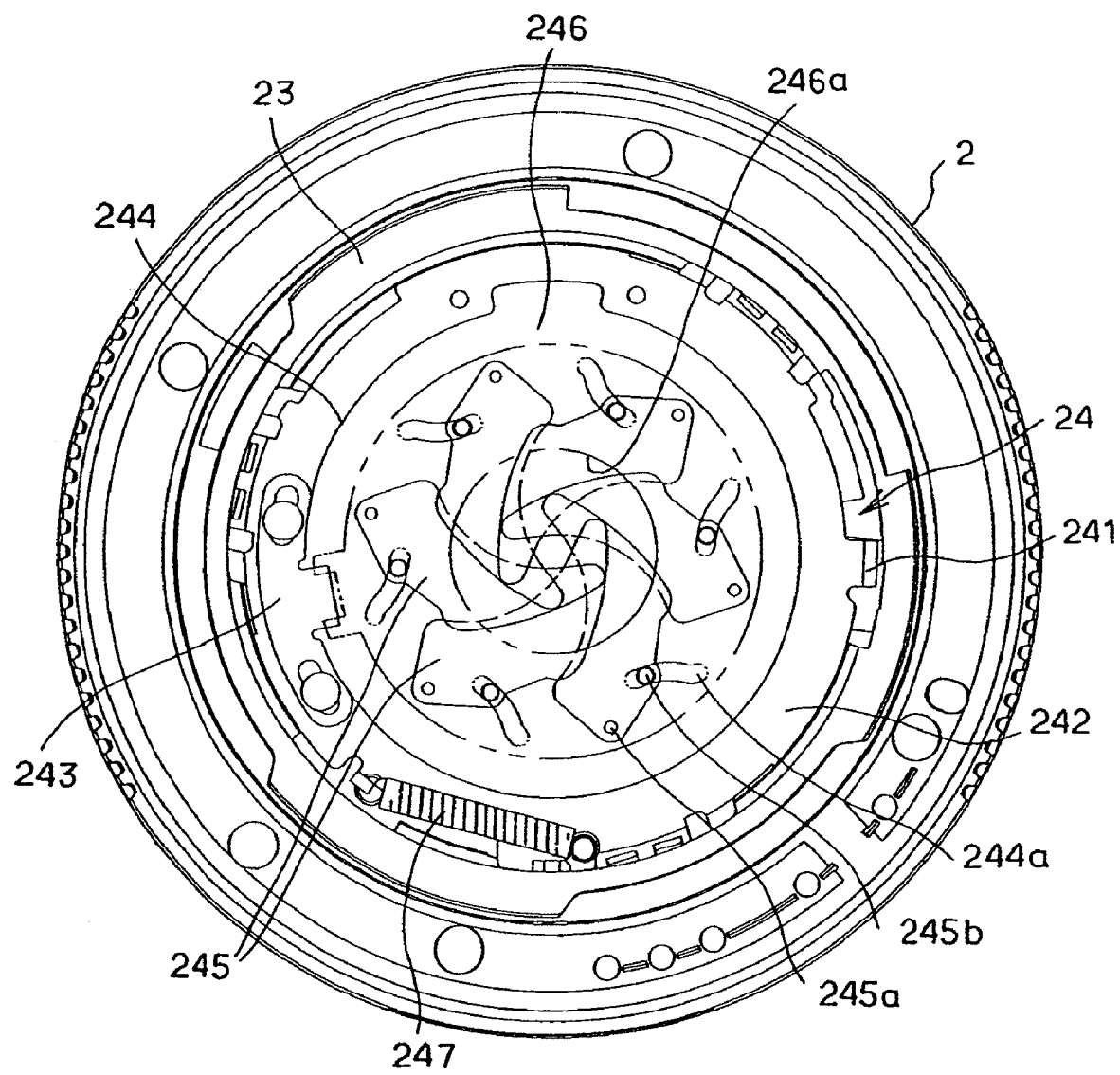
FIG. 2A is a rear elevational view of the interchangeable lens shown in FIG. 1B with parts thereof removed for clarity, showing the iris diaphragm, the diaphragm drive mechanism and associated elements provided in the interchangeable lens in a full stop-down state.

FIG. 2A is a rear elevational view of the interchangeable lens 2 with parts thereof being removed for clarity, viewed from the rear of the interchangeable lens in the optical axis direction (the direction of an optical axis O shown in FIG. 1B). FIG. 3A is a perspective view of a diaphragm drive mechanism 17 of the camera body 1 which is configured to drive the diaphragm-driving slide plate 173 that is provided in the camera body 1, viewed obliquely from below and the front left of the camera body 1. The structure of the diaphragm mechanism 24 is the same as that adopted in conventional interchangeable lenses. The diaphragm mechanism 24 is provided with a diaphragm ring (drive ring) 242, a ring cam 244 and a plurality of diaphragm blades 245. The diaphragm control bar 241 is formed integral with a circumferential part of the diaphragm ring 242 to project rearward in the optical axis direction, so that the diaphragm ring 242 rotates with the diaphragm control bar 241 about the optical axis O. The ring cam 244 is coupled to the diaphragm ring 242 via an engaging plate 243 so as to rotate integrally with the diaphragm ring 242 when the diaphragm ring 242 is rotated. The plurality of diaphragm blades 245 are turned by rotation of the ring cam 244 so as to change the diameter of a central opening formed by the plurality of diaphragm blades 245. Each diaphragm blade 245 is provided with a pivot 245a and is pivoted on a diaphragm stationary ring 246 via the pivot 245a to be capable of rotating about the pivot 245a in a plane in which the diaphragm blade 245 lies. The diaphragm stationary ring 246 is provided at a center thereof with a circular optical-axis aperture 246a. Each diaphragm blade 245 is provided on another portion thereof with a cam follower 245b in the shape of a pin which is engaged in a corresponding cam slot (curved slot) 244a formed in the ring cam 244. The diaphragm ring 242 is biased to rotate counterclockwise as viewed in FIG. 2A by a gearing-rod restoring spring (extension coil spring) 247 which is extended between a pin fixed to the diaphragm ring 242 and another pin fixed to a stationary portion of the interchangeable lens 2.

The diameter of the optical-axis aperture 246a of the diaphragm stationary ring 246, which has the center thereof on the optical axis O, is predetermined to be substantially identical to the minimum F-number (full aperture/maximum aperture size) of the interchangeable lens 2.

In the diaphragm mechanism 24, when the interchangeable lens 2 is not mounted to the camera body 1, the diaphragm ring 242 has been fully rotated by the spring force of the gearing-rod restoring spring 247 and held at the fully rotated position in the counterclockwise direction as viewed in FIG. 2A, while each diaphragm blade 245 has been fully rotated in the counterclockwise direction as viewed in FIG. 2A about the associated pivot 245a via the engagement of the associated cam slot 244a of the ring cam 244 with the associated cam follower 245b to enter the optical-axis aperture 246a so that the plurality of diaphragm blades 245 collaborate to form a minimum aperture size, i.e., to set the maximum F-number of the interchangeable lens 2. In this state, rotating the diaphragm control bar 241 against the spring force of the gearing-rod restoring spring 247 by a required angle of rotation as shown by the arrow in FIG. 2B causes the diaphragm ring 242 to rotate clockwise against the spring force of the gearing-rod restoring spring 247, and the rotation of the diaphragm ring 242 to the fully clockwise rotated position causes each diaphragm blade 245 to rotate clockwise about the associated pin 245a via the engagement of the associated cam slot 244a of the ring cam 244 with the associated cam follower 245b so that each diaphragm blade 245 retracts from the optical-axis aperture 246a of the diaphragm stationary ring 246 to thereby make the plurality of diaphragm blades 245 form a full-aperture with the minimum F-number (maximum aperture size). Namely, the F-number of the interchangeable lens 2 changes in response to changes in rotational position of the diaphragm control bar 241.

Figure 4:
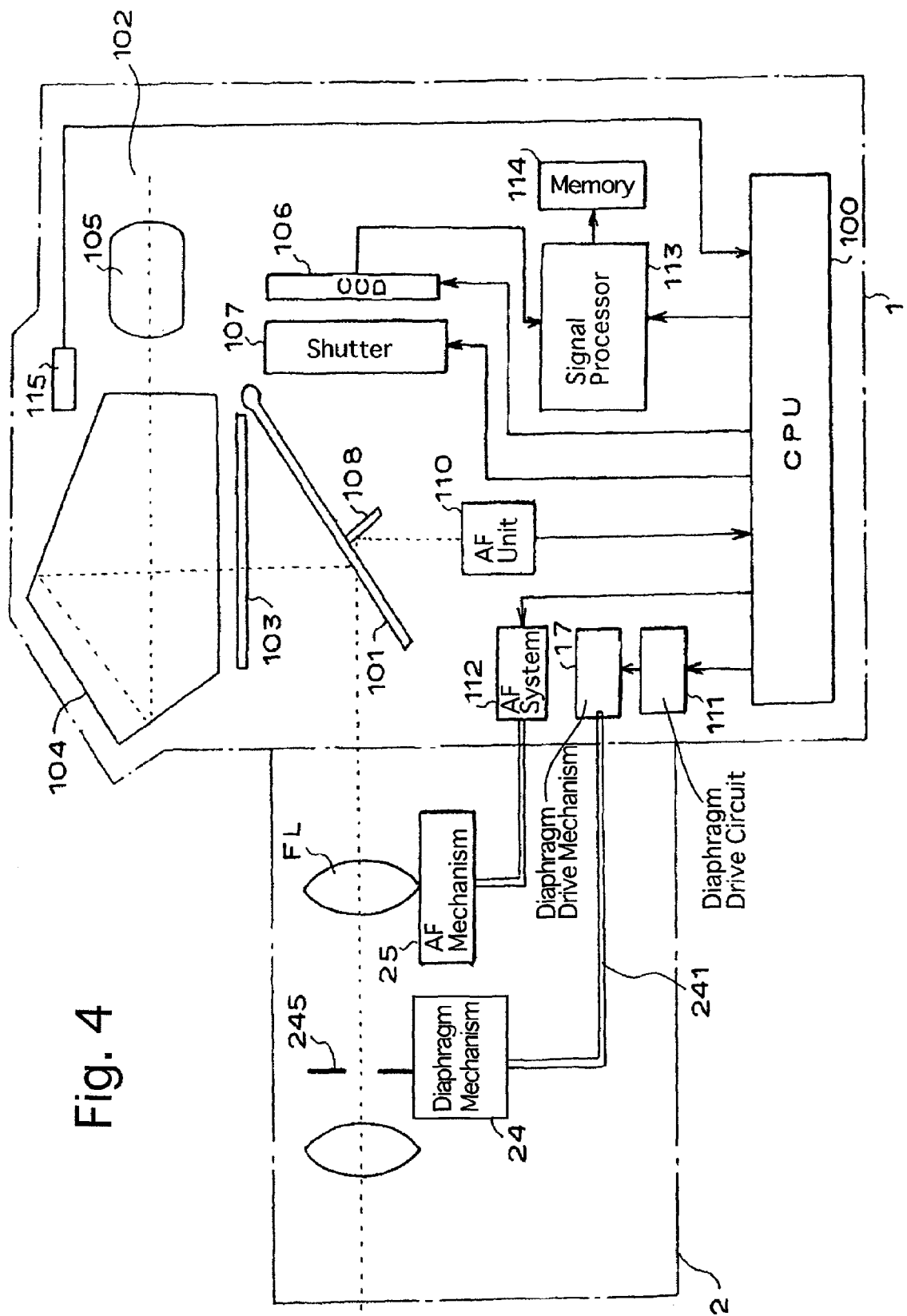
FIG. 4 is a schematic diagram of elements of the camera system in a state where the interchangeable lens is mounted to the camera body.

FIG. 4 shows a schematic diagram showing a state where the interchangeable lens 2 is mounted to the camera body 1. The camera body 1 is provided with an optical viewfinder 102, an imaging device 106, a shutter mechanism 107, a sub-mirror 108 and an AF unit 110. The optical viewfinder 102 includes a focusing screen 103, a pentagonal prism 104 and an eyepiece 105. The main mirror 101 reflects the incident light of an object image, which is passed through the interchangeable lens 2, upwards, toward the focusing screen 103 so that the object image is formed thereon to be viewed through the eyepiece 105 via the pentagonal prism 104. The imaging device 106 is provided with an image pickup device such as a CCD image sensor for capturing an object image by receiving light of an object image immediately after the main mirror 101 rotates upwards upon a shutter release. The sub-mirror 108 is pivoted on the back of the main mirror 101 and reflects the incident object light downwards which is passed through a part of the main mirror 110. The AF unit 110 receives the object light reflected by the sub-mirror 108 to determine the distance to the object. Additionally, the camera body 1 is provided therein with the diaphragm drive mechanism 17 that is configured to drive the diaphragm mechanism 24 of the interchangeable lens 2. The camera body 1 is further provided therein with a diaphragm drive circuit 111 and an AF system 112. The diaphragm drive circuit 111 controls the operation of the diaphragm drive mechanism 17. The AF mechanism 25 drives the focusing lens group FL that is provided in the interchangeable lens 2, and the AF system 112 controls the operation of the AF mechanism 25 via the AF coupler 16 to perform AF control.

The camera body 1 is further provided therein with a signal processor 113 and an image memory 114. The signal processor 113 performs signal processing on an image signal obtained by capturing an object image by the imaging device 106 and stores the processed image signal in the image memory 114 after compressing or not compressing the processed image signal. The signal processing operation of the signal processor 113 is known in the art, and accordingly, the description of the signal processing operation will be omitted from the following descriptions. The camera body 1 is further provided therein with a CPU 100. Photometric information output from a photometering element 115 provided in the optical viewfinder 102 of the camera body 1 and AF information output from the AF unit 110 are input to the CPU 100, and the CPU 100 calculates a correct F-number and a correct focal point based on the photometric information and the AF information. Although the CPU 100 is for controlling operations of the imaging device 106, the shutter mechanism 107, the CPU 100 is configured be capable of controlling the operation of the diaphragm drive mechanism 17 via the diaphragm drive circuit 111 by outputting data on the calculated F-number to the diaphragm drive circuit 111 based on photometric information input from the photometering element 115.

Figure 5:
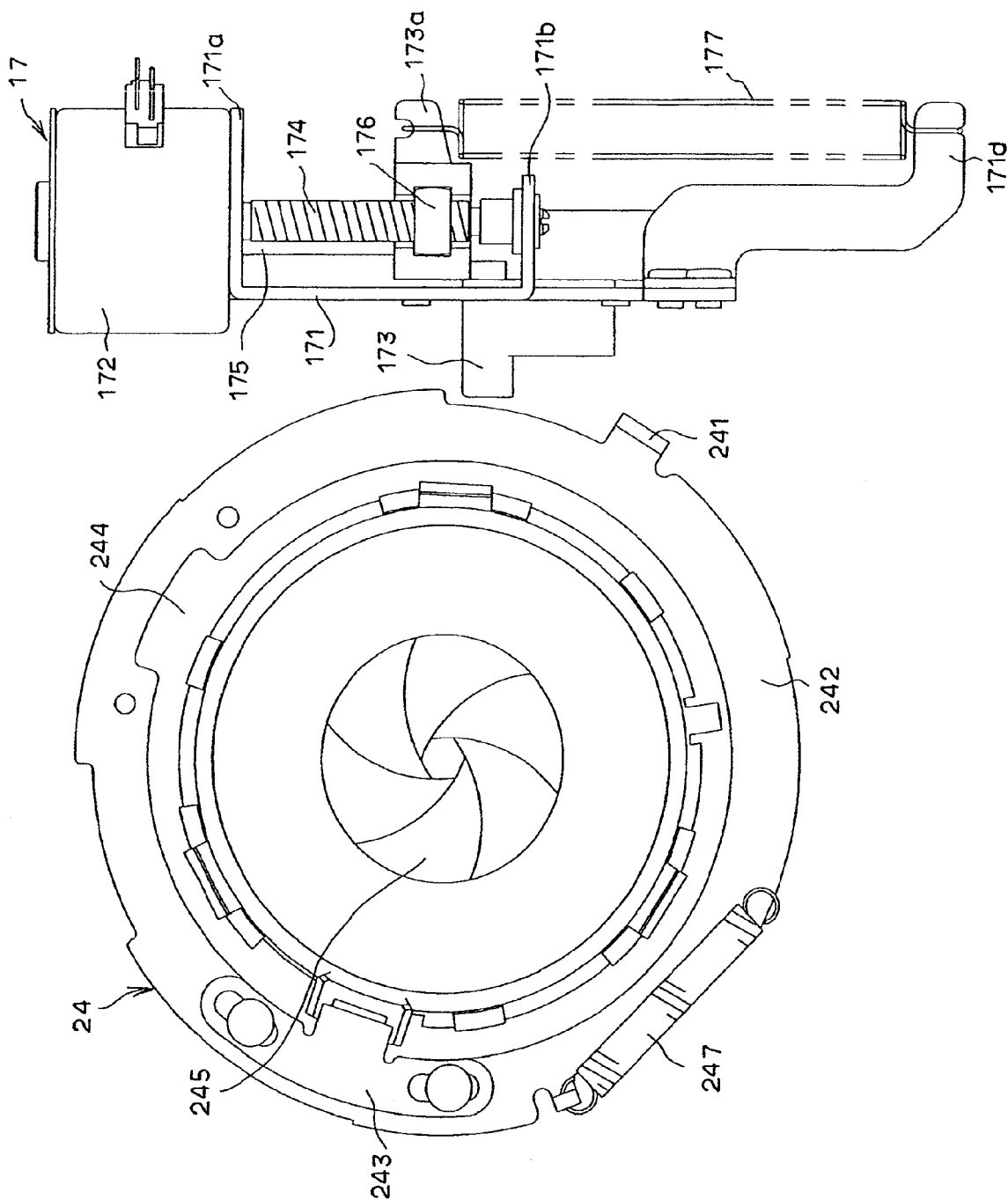
FIG. 5 is a rear elevational view of the diaphragm drive mechanism shown in FIG. 3A and the diaphragm mechanism shown in FIG. 3B in a state where the bayonet portion of the interchangeable lens is inserted into the lens mount of the camera body but has not yet been turned relative to the lens mount of the camera body to be locked therewith.

As shown in FIG. 3A, the diaphragm drive mechanism 17 that is provided in the camera body 1 is mounted to a frame 171 fixed to the mirror box 16 to be supported thereby. The diaphragm drive mechanism 17 is provided with a diaphragm drive motor 172, which is a stepping motor and constitutes a drive source, and the diaphragm-driving slide plate 173 that is slidingly moved up and down in the mirror box 16 by the diaphragm drive motor 172. FIG. 5 is a rear elevational view of the diaphragm drive mechanism 17 and the diaphragm mechanism 24, viewed from the back of these mechanisms shown in FIGS. 3A and 3B in the optical axis direction, in a state immediately after the bayonet portion 23 of the interchangeable lens 2 is inserted into the lens mount 14 of the camera body 1 to attach the interchangeable lens 2 to the camera body 1 and before the bayonet portion 23 is turned relative to the lens mount 14 to be locked therewith. In this state shown in FIG. 5, the diaphragm control bar 241 is not yet engaged with the diaphragm-driving slide plate 173. The diaphragm drive motor 172 is supported by an upper end lug 171a of the frame 171 with a rotary output shaft 172a of the diaphragm drive motor 172 being directed downward. A rotatable lead screw 174 with a helical groove which is rotatably supported at the lower end thereof by a middle lug 171b of the frame 171 is coaxially fixed to the rotary output shaft 172a at the upper end of the rotatable lead screw 174 to be rotatable by the diaphragm drive motor 172. The frame 171 is provided below the middle lug 171b with a second lug 171c, and is further provided between the upper end lug 171a and the second lug 171c with a guide bar 175 which extends vertically. The diaphragm-driving slide plate 173 is supported by the guide bar 175 to be slidable thereon in the vertical direction. A lead nut 176 which is screwed on the lead screw 174 is fixed to the diaphragm-driving slide plate 173, and a rotation of the lead screw 174 causes the lead nut 176 to move on the lead screw 174 in the axial direction thereof, thus causing the diaphragm-driving slide plate 173 that is integral with the lead nut 176 to move along the guide bar 175 in the vertical direction. Hence, the lead screw 174 and the lead screw 176 constitute a converting mechanism (feed-screw mechanism) for converting torque of the diaphragm drive motor 172 into a force for moving the diaphragm-driving slide plate 173. Additionally, a diaphragm-driving slide plate restoring spring (extension coil spring) 177 is extended between a portion 173a of the diaphragm-driving slide plate 173 and a lower end lug 171d of the frame 171 to bias the diaphragm-driving slide plate 173 downward.

The lead angle of the helical groove on the lead screw 174 (the angle of the helical groove relative to the axial direction: the amount of movement of the helical groove relative to the angle of rotation of the lead screw 174 in the axial direction) is predetermined to be an angle allowing the lead screw 174 to rotate integrally with the rotary output shaft 172a of the diaphragm drive motor 172 on the axis thereof when the lead nut 176 is forced to translate along the axis of the lead screw 174, namely, a relatively large angle which makes it possible to rotate the lead screw 174 about the axis thereof against the detent torque of the diaphragm drive motor (stepping motor) 172 (i.e., toque required to rotate the rotary output shaft 172a when the diaphragm drive motor 172 is not in operation). In other words, the diaphragm drive motor 172 can be rotated when the diaphragm-driving slide plate 173 is forcibly moved. In addition, the spring force of the diaphragm-driving slide plate restoring spring 177 is predetermined to be greater than the spring force of the gearing-rod restoring spring 247 that is provided as an element of the diaphragm mechanism 24 and to have a large spring force capable of pulling the diaphragm-driving slide plate 173 downward as viewed in FIG. 5 against the aforementioned detent torque.

Figure 6:
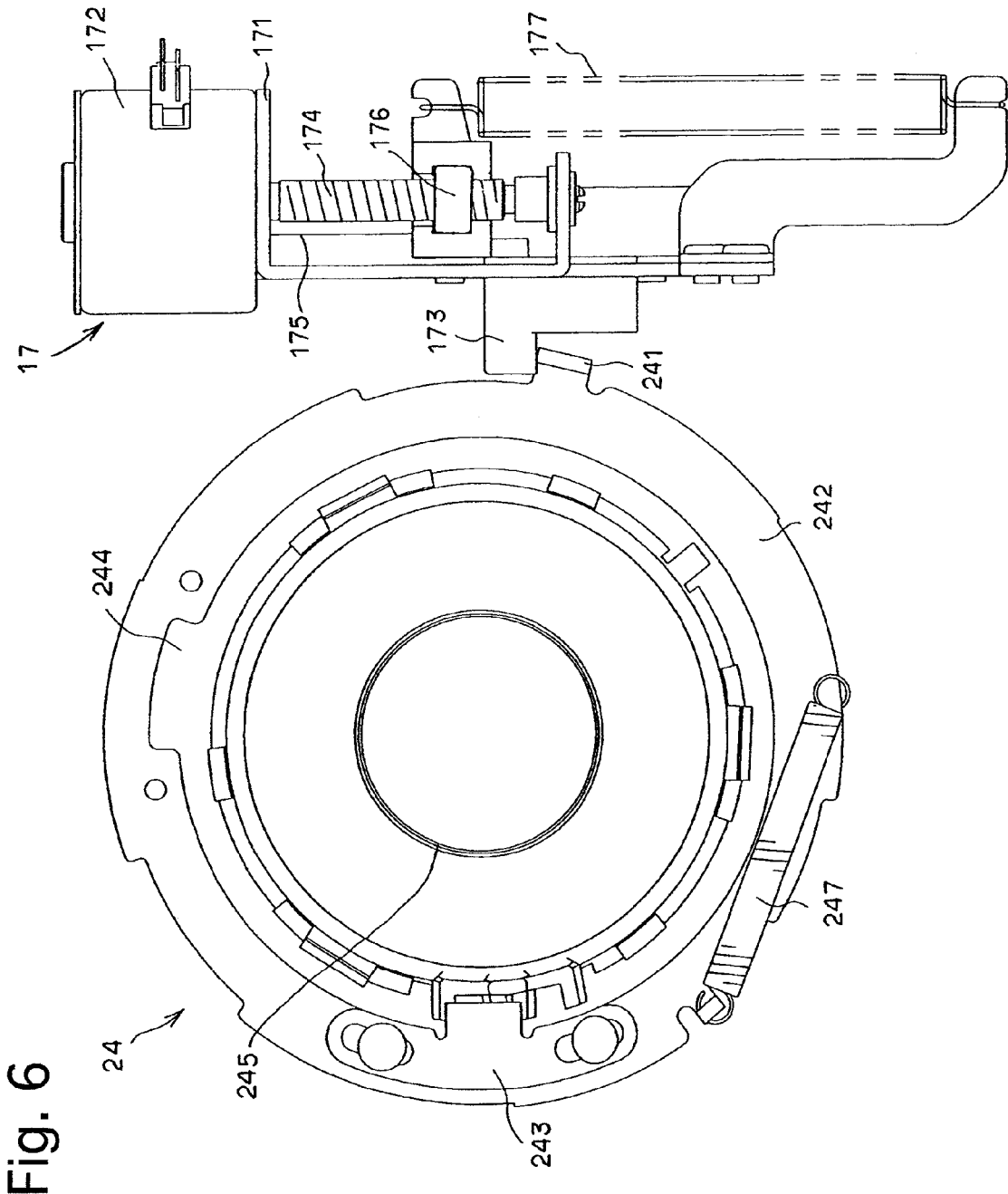
FIG. 6 is a view similar to that of FIG. 5, showing a maximum aperture-size state of the diaphragm after the interchangeable lens is mounted to the camera body.
Figure 7:
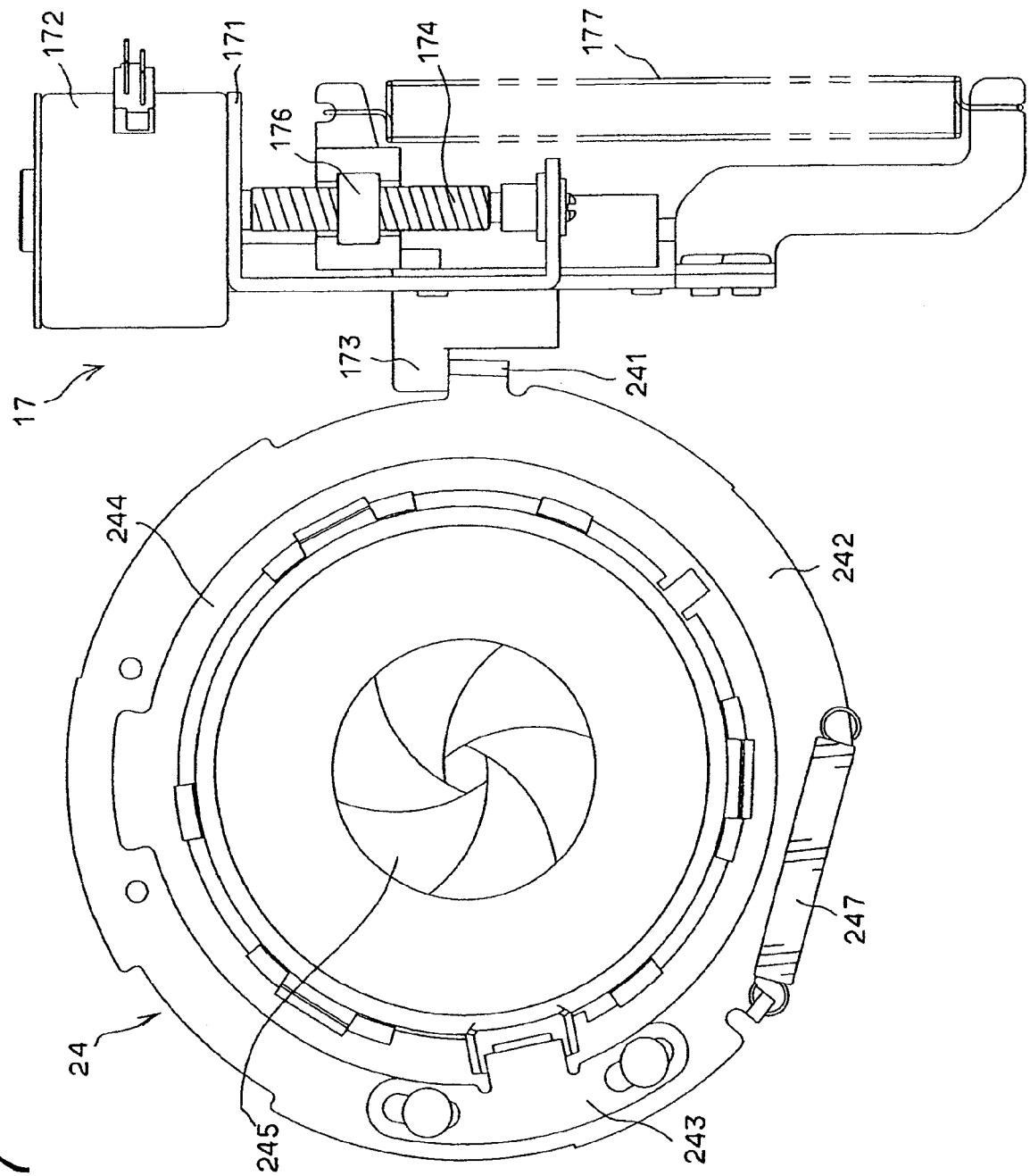
FIG. 7 is a view similar to that of FIG. 5, showing a state where the diaphragm is stopped down upon a shutter release.

Operations of the diaphragm mechanism 24 in association with the photographing operation of the present embodiment of the camera system that has the above described structure will be hereinafter discussed with reference to FIGS. 5 through 7. FIGS. 5 through 7 show rear elevational views of the diaphragm drive mechanism 17 and the diaphragm mechanism 24, viewed from the camera body 1 side, i.e., from the rear of the interchangeable lens 2. Firstly, FIG. 5 shows a state immediately after the bayonet portion 23 is inserted into the lens mount 14 to attach the interchangeable lens 2 to the camera body 1. In this state, the diaphragm control bar 241 has not yet been engaged with the diaphragm-driving slide plate 173. Therefore, in the state shown in FIG. 5, the diaphragm control bar 241 is held in the initial position thereof at a lower position in the clockwise direction by the spring force of the gearing-rod restoring spring 247, the diaphragm mechanism 24 is in a state of a maximum F-number (minimum aperture size), and the diaphragm-driving slide plate 173 is held in a lower position which constitutes the initial position thereof by the spring force of the diaphragm-driving slide plate restoring spring 177.

Figure 2B:
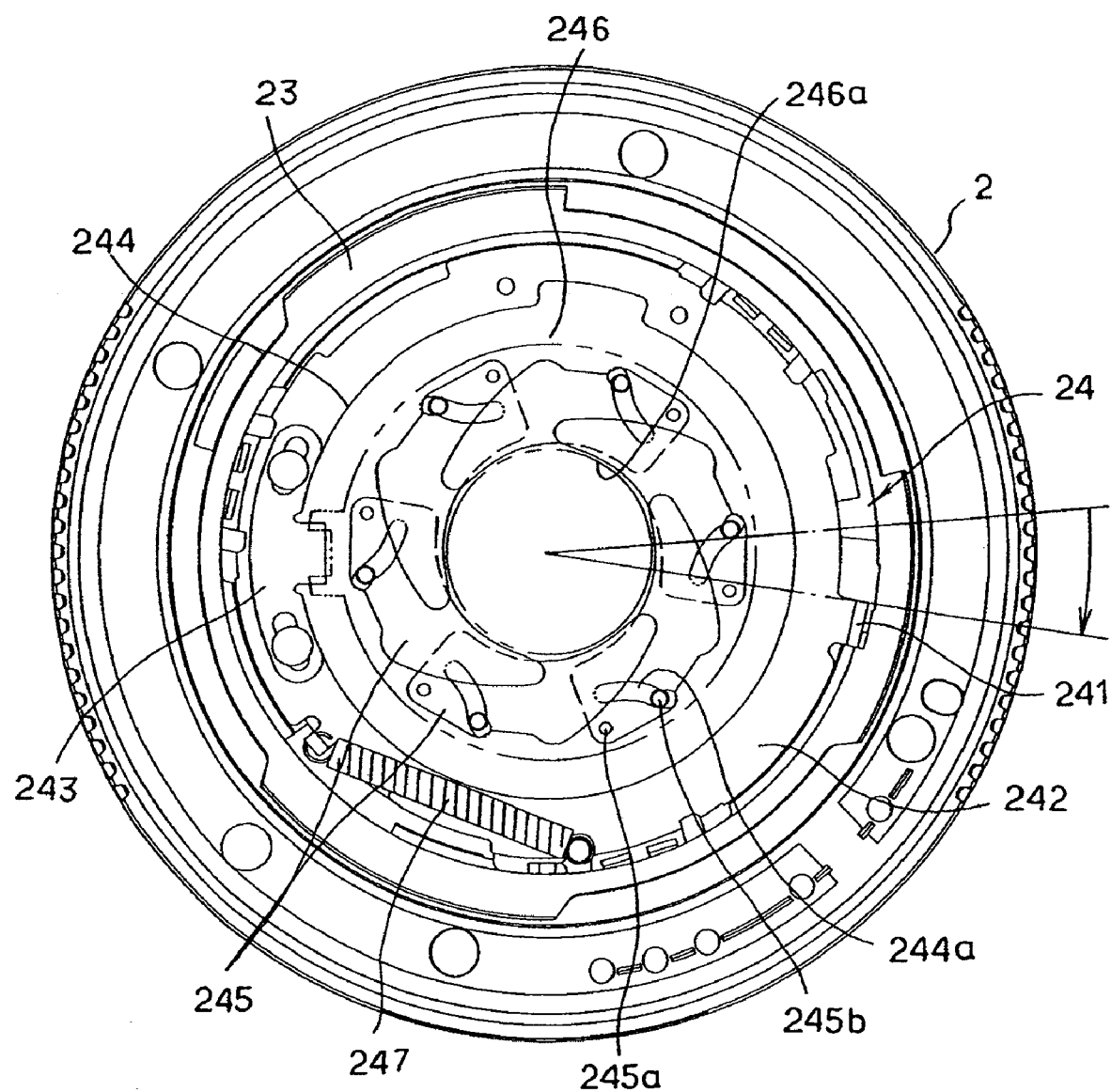
FIG. 2B is a view similar to that of FIG. 2A, showing the iris diaphragm, the diaphragm drive mechanism and the associated elements of the interchangeable lens in a maximum aperture-size state.

In this state shown in FIG. 5, turning the interchangeable lens 2 counterclockwise by a small angle of rotation relative to the lens mount 14 to bring the bayonet portion 23 into engagement with the lens mount 14 causes the diaphragm control bar 241 to come into contact with the diaphragm-driving slide plate 173 from below as viewed in FIG. 5, i.e., in the counterclockwise direction of the diaphragm ring 242. At this stage, since the diaphragm-driving slide plate 173 is biased in a downward direction by the diaphragm-driving slide plate restoring spring 177, the diaphragm ring 242 is prevented from rotating with the interchangeable lens 2, and the relative rotation of the interchangeable lens 2 with respect to the lens mount 14 causes relative rotation of the diaphragm ring 242 with the interchangeable lens 2 while extending the gearing-rod restoring spring 247. When the diaphragm ring 242 reaches the rotational limit thereof, the interchangeable lens 2 and the camera body 1 are not yet completely locked, so that further turning the interchangeable lens 2 in the same counterclockwise direction relative to the lens mount 14 causes diaphragm control bar 241 to move the diaphragm-driving slide plate 173 upward as shown in FIG. 6. Consequently, the diaphragm mechanism enters a maximum aperture-size state (minimum F-number state) as shown in FIG. 2B.

After the interchangeable lens 2 is properly attached to the camera body 1 in the above described manner, depressing the release button 11 half way causes the photometering element 115 to perform a photometering operation and also causes the AF unit 110 to perform a distance measurement operation. Thereupon, the CPU 100 calculates a correct F-number from photometric data obtained (object brightness information) by the photometering operation and calculates a focal point from distance-measurement data obtained by the distance measurement operation. Information on the calculated correct F-number is input to the diaphragm drive circuit 111. Similarly, information on the calculated focal point is input to the AF system 112. Although the AF system 112 operates to make the interchangeable lens 2 perform an AF operation based on this input information on the calculated focal point, the details of this AF operation will be omitted from the following descriptions.

Thereafter, upon the release button 11 being fully depressed, the CPU 100 outputs a drive signal for input to a mirror drive circuit (not shown) for driving the main mirror 101 to raise the main mirror 101. Simultaneously, the diaphragm drive circuit 111 outputs a drive signal for input to the diaphragm drive mechanism 17 so that the diaphragm drive mechanism 17 drives the diaphragm drive motor 172 to rotate the rotary output shaft 172a by an amount of rotation corresponding to the calculated correct F-number. This rotation of the diaphragm drive motor 172 causes the lead screw 174 to rotate on the axis thereof, and this rotation of the lead screw 174 causes the lead nut 176 and the diaphragm-driving slide plate 173 that is integral with the lead nut 176 to move upward (i.e., in a diaphragm stop-down direction) as viewed in FIG. 7 from the initial position thereof (the position shown in FIG. 6) against the biasing force of the diaphragm-driving slide plate restoring spring 177 as shown in FIG. 7. This upward movement of the diaphragm-driving slide plate 173 allows the diaphragm control bar 241 to move upward by the spring force of the gearing-rod restoring spring 247 with the diaphragm control bar 241 remaining in contact with the diaphragm-driving slide plate 173, thus allowing the diaphragm control bar 241 to rotate counterclockwise to thereby stop down the diaphragm mechanism 24. The stop-down amount of the diaphragm mechanism 24 depends on the amount of upward sliding movement of the diaphragm-driving slide plate 173 from the initial position shown in FIG. 6, i.e., the amount of counterclockwise rotation of the diaphragm control bar 241.

When the diaphragm-driving slide plate 173 fully moves upward (in the diaphragm stop-down direction) to a maximum position, the amount of upward movement of the diaphragm control bar 241 also reaches a maximum position while the F-number of the diaphragm mechanism 24 becomes maximum (i.e., the aperture size of the diaphragm mechanism 24 becomes minimum) just as in the case shown in FIG. 2A.

Thereafter, the shutter mechanism 107 performs a shutter opening operation, an object image is formed on the imaging device 106, and an imaging operation is performed. Upon the shutter mechanism 107 shutting after the completion of the imaging operation, the main mirror 101 moves down to the initial position thereof while the diaphragm drive motor 172 is driven to rotate in the reverse direction back to the initial rotational position thereof. Upon the diaphragm drive motor 172 rotating back to the initial rotational position thereof, the diaphragm-driving slide plate 173 moves down (i.e., in a diaphragm opening direction), back toward the initial position shown in FIG. 6, and this downward movement of the diaphragm-driving slide plate 173 causes the diaphragm control bar 241 to rotate integrally with the diaphragm-driving slide plate 173 in the clockwise direction. Subsequently, the diaphragm mechanism 24 is brought back to the maximum aperture-size state shown in FIG. 2B by the subsequent downward movement of the diaphragm-driving slide plate 173 to the initial position. At this time, the diaphragm drive circuit 111 can stop outputting a drive signal for input to the diaphragm drive mechanism 17. If no drive signal is input to the diaphragm drive mechanism 17 from the diaphragm drive circuit 111, the diaphragm drive motor 172 produces no torque so as to become freely rotatable by a torque greater than the detent torque of the diaphragm drive motor 172. Therefore, the diaphragm-driving slide plate 173 is moved down (in the diaphragm opening direction) to the initial position along the axis of the lead screw 174 by the spring force of the diaphragm-driving slide plate restoring spring 177 while forcibly rotating the lead screw 174. This downward movement of the diaphragm-driving slide plate 173 causes the diaphragm control bar 241 to rotate integrally with the diaphragm-driving slide plate 173 in the clockwise direction, and the diaphragm mechanism 24 is again brought back to the maximum aperture-size state shown in FIG. 2B. Even in the case where the F-number is changed in this manner, the one-to-one correlation between the step position of the diaphragm drive motor 172 and the F-number is maintained at all times since the diaphragm drive motor 172 rotates integrally with variations in the F-number. Additionally, in a state where the diaphragm drive motor 172 stops at a predetermined rotational position thereof due to a drive signal input to the diaphragm drive mechanism 17, the torque of the diaphragm drive motor 172 is greater than the detent torque thereof, so that the diaphragm drive motor 172 is not forcibly rotated by an external force even if the diaphragm-driving slide plate 173 moves by the spring force of the diaphragm-driving slide plate restoring spring 177.

When moving images are recorded, the main mirror 101 is held in the mirror-up state during movie recording, the shutter mechanism 107 is held open, and the imaging device 106 continues to perform an imaging operation (movie recording operation). During this movie recording, if photometric data obtained by the photometering operation performed by the photometering element 115 changes due to variations in object brightness, the CPU 100 changes information on the F-number which is input to the diaphragm drive circuit 111 in accordance with the changes of the photometric data to control the amount of rotation of the diaphragm drive motor 172 via the diaphragm drive mechanism 17. This changes the amount of rotation of the lead screw 174 and simultaneously changes the position of the diaphragm-driving slide plate 173 in the vertical direction, which causes the rotational position of the diaphragm control bar 241 to change in response to the changes in position of the diaphragm-driving slide plate 173, so that the F-number of the diaphragm mechanism 24 is controlled to become a correct F-number which corresponds to object brightness. This control makes the present embodiment of the camera system possible to record moving images at a correct exposure.

Accordingly, with the camera body 1 in the present embodiment of the camera system, even in the case where the already-existing interchangeable lens 2, in which the operation of the diaphragm mechanism 24 is controlled by the diaphragm control bar 241, is attached to the camera body 1 to constitute a camera system, moving images can be recorded at correct exposure with the main mirror held in the mirror-up state in a movie mode at a correct exposure in response to changes in object brightness, and still images can be taken in a still-photography mode at correct exposure in response to changes in object brightness. In addition, since the diaphragm mechanism 24 can be brought into a maximum aperture-size state by moving the diaphragm-driving slide plate 173 to the initial position thereof when the diaphragm drive motor 172 is stopped rotating, the diaphragm mechanism of the interchangeable lens can be reliably set to a maximum aperture-size state even when different types of interchangeable lenses whose initial positions of the diaphragm control bars are different from each other are selectively attached to the camera body 1. In this case, the camera body 1 can exercise correct diaphragm control from this time on by setting the rotational position of the diaphragm drive motor 172 at this time as the initial position thereof.

Although the diaphragm mechanism of the interchangeable lens in the above illustrated embodiment of the camera system is an example of a standard diaphragm mechanism, the present invention can be applied to any camera system in a similar manner as long as the camera system adopts an interchangeable lens with a diaphragm control bar for changing the F-number by changing the rotational position thereof.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A diaphragm driving device provided in a camera body of a digital camera to which an interchangeable lens is detachably attached, said interchangeable lens including a diaphragm mechanism having a diaphragm control bar for changing an aperture size by a rotation of said diaphragm control bar about an optical axis, wherein said camera body comprises:

a diaphragm-driving slide plate which engages with said diaphragm control bar when said interchangeable lens is attached to said camera body;

a diaphragm drive motor which rotates in both forward and reverse directions for moving said diaphragm-driving slide plate step wise in accordance with object brightness information of an object image formed through said interchangeable lens; and a converting mechanism for converting the rotation of said diaphragm drive motor in said forward and reverse directions into a force for moving said diaphragm-driving slide plate in corresponding diaphragm stop-down and diaphragm-opening directions;

wherein said diaphragm drive motor can be rotated, via said converting mechanism, when said diaphragm-driving slide plate is forcibly moved.

2. The diaphragm driving device according to claim 1, wherein said converting mechanism comprises:

a lead screw which is rotated on an axis thereof by said diaphragm drive motor; and a lead nut which is screw-engaged with said lead screw to be movable thereon along said axis of said lead screw, wherein said diaphragm-driving slide plate is integral with said lead nut.

3. The diaphragm driving device according to claim 2, wherein a lead angle of said lead screw is predetermined to be an angle which makes it possible to rotate said lead screw to move said diaphragm-driving slide plate against a detent torque of said diaphragm drive motor.

4. The diaphragm driving device according to claim 2, wherein a rotary output shaft of said diaphragm drive motor extends in a vertical direction of said camera body, said lead screw being coaxially fixed to said rotary output shaft to extend downward therefrom.

5. The diaphragm driving device according to claim 1, wherein said converting mechanism comprises a first spring for bringing said diaphragm-driving slide plate to move to a predetermined position thereof.

6. The diaphragm driving device according to claim 5, wherein said diaphragm mechanism is in a maximum aperture-size state when said diaphragm-driving slide plate is in said predetermined position.

7. The diaphragm driving device according to claim 5, wherein said diaphragm mechanism comprises a second spring for causing said diaphragm control bar to rotate to an initial position thereof, and wherein a spring force of said first spring is greater than a spring force of said second spring so that the first spring is capable of moving diaphragm-driving slide plate against a detent torque of said diaphragm drive motor.

8. The diaphragm driving device according to claim 5, wherein said diaphragm mechanism is in a minimum aperture-size state when said diaphragm control bar is in an initial position thereof, and wherein said diaphragm mechanism is brought into a maximum aperture-size state by said diaphragm-driving slide plate at said predetermined position thereof when said interchangeable lens is attached to said camera body.

9. The diaphragm driving device according to claim 1, wherein said diaphragm drive motor comprises a stepping motor.

10. The diaphragm driving device according to claim 1, further comprising a diaphragm ring positioned coaxially around said optical axis to be rotatable about said optical axis, said diaphragm control bar being integrally formed with said diaphragm ring.

11. The diaphragm driving device according to claim 1, wherein said diaphragm drive motor is supported by a frame fixed to a mirror box, in which a quick-return mirror is positioned, of said camera body.

12. The diaphragm driving device according to claim 11, wherein said digital camera comprises a movie mode and a still-photography mode;

wherein upon said movie mode being selected, said diaphragm drive motor is continuously controlled in accordance with object brightness information of an object image formed through said interchangeable lens while a mirror-up operation, in which said quick-return mirror is continuously held in a mirror-up state, is performed.

13. A camera body of a digital camera system to which an interchangeable lens is detachably attached, an adjustable diaphragm of said interchangeable lens being driven between a maximum aperture-size state and a minimum aperture-size state by a rotational movement of a diaphragm control bar of said interchangeable lens about an optical axis, said camera body comprising:

a diaphragm-driving slide plate which engages with said diaphragm control bar when said interchangeable lens is attached to said camera body;

a diaphragm drive motor for moving said diaphragm-driving slide plate; and a feed-screw mechanism installed between said diaphragm-driving slide plate and said diaphragm drive motor so that a rotation of said diaphragm drive motor causes said diaphragm-driving slide plate to move linearly via said feed-screw mechanism.

14. The camera body according to claim 13, wherein said digital camera comprises a movie mode and a still-photography mode;

wherein upon said movie mode being selected, said diaphragm drive motor is continuously controlled in accordance with object brightness information of an object image formed through said interchangeable lens while a mirror-up operation, in which said quick-return mirror is continuously held in a mirror-up state, is performed.

* * * * *